US 8,903,929 B2

(12) United States Patent
Caldwell et al.

(10) Patent No.: US 8,903,929 B2
(45) Date of Patent: Dec. 2, 2014

(54) FORGOTTEN ATTACHMENT DETECTION

(75) Inventors: Nicholas Van Caldwell, Bellevue, WA (US); David Claux, Redmond, WA (US); Benjamin Edward Childs, Seattle, WA (US); Saliha Azzam, Redmond, WA (US); Fetiye Karabay, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 190 days.

(21) Appl. No.: 13/542,102

(22) Filed: Jul. 5, 2012

(65) Prior Publication Data
US 2014/0012923 A1     Jan. 9, 2014

(51) Int. Cl.
G06F 15/16     (2006.01)

(52) U.S. Cl.
USPC ............................. 709/206; 709/227; 370/254

(58) Field of Classification Search
CPC ......... H04L 45/00; H04L 45/04; H04L 51/38; H04L 51/00; G06F 17/30321; G06F 15/16
USPC .................................. 709/206, 227; 370/254
See application file for complete search history.

(56) References Cited

U.S. PATENT DOCUMENTS

| 6,073,133 | A | 6/2000 | Chrabaszcz |
| 6,970,908 | B1 | 11/2005 | Larky et al. |
| 7,016,937 | B1 | 3/2006 | Malik |
| 7,574,349 | B2 | 8/2009 | Perronnin |
| 8,286,085 | B1* | 10/2012 | Denise ........................... 715/752 |
| 8,676,273 | B1* | 3/2014 | Fujisaki ........................ 455/567 |
| 2002/0138579 | A1 | 9/2002 | Goldberg |
| 2003/0028647 | A1* | 2/2003 | Grosu ............................ 709/227 |
| 2006/0123090 | A1 | 6/2006 | Youngs |
| 2006/0291404 | A1* | 12/2006 | Thubert et al. ................ 370/254 |
| 2007/0100946 | A1 | 5/2007 | Kairis, Jr. |
| 2007/0100947 | A1 | 5/2007 | Chen et al. |
| 2007/0233459 | A1 | 10/2007 | Perronnin |
| 2007/0244975 | A1* | 10/2007 | Dillon et al. ................... 709/206 |
| 2007/0261099 | A1* | 11/2007 | Broussard et al. ................ 726/1 |

(Continued)

FOREIGN PATENT DOCUMENTS

EP     1087315 A2     3/2001

OTHER PUBLICATIONS

"Forgotten Attachment Detector," downloaded Nov. 9, 2011 from http://www.officelabs.com/projects/forgottenattachmentdetector/Pages/default.aspx, 1 page.
Kewisch et al., "Attachment Reminder 0.3.10," downloaded Nov. 11, 2011 from https://addons.mozilla.org/en-US/thunderbird/addon/attachment-reminder/?src=ss, 9 pages.

(Continued)

Primary Examiner — Tesfay Yohannes
(74) Attorney, Agent, or Firm — Rachael Vaughn; Jim Ross; Micky Minhas

(57) ABSTRACT

A user is writing an email or other message. A text processing layer prepares the message for analysis and performs some initial analysis and preparation such as a sentence separator, a "tokenizer", a "unique body" identification, and/or possibly other filtering or analysis routines. An analytics layer analyzes the message using a "regular expressions" analysis, a statistical natural language processing analysis, and/or a template matching analysis. If an attachment is indicated, a suggestion to add an attachment is provided to the user. The analysis may begin when the user begins creating the message, indicates that the message should be sent, or at some point in between. The user may provide feedback that the suggestion is accepted or that the suggestion is rejected.

20 Claims, 7 Drawing Sheets

(56) References Cited

U.S. PATENT DOCUMENTS

| | | | |
|---|---|---|---|
| 2007/0299924 A1 | 12/2007 | Tremblay | |
| 2008/0244750 A1 | 10/2008 | Romero | |
| 2008/0250112 A1 | 10/2008 | Chen et al. | |
| 2008/0256101 A1* | 10/2008 | Kochan et al. | 707/100 |
| 2009/0019119 A1 | 1/2009 | Scheffler | |
| 2010/0198975 A1* | 8/2010 | Willars et al. | 709/227 |
| 2010/0223097 A1* | 9/2010 | Kramer et al. | 705/10 |
| 2011/0080853 A1* | 4/2011 | Thubert et al. | 370/255 |
| 2012/0096036 A1* | 4/2012 | Ebaugh et al. | 707/780 |

OTHER PUBLICATIONS

Knichel, Mark, "Gmail Labs Graduation and Retirement," Feb. 25, 2010, Official Gmail Blog, downloaded Nov. 11, 2011 from http://gmailblogspot.com/2010/02/gmail-labs-graduation-and-retirement.html#!/2010/02/gmail-labs-graduation-and-retirement.html, 4 pages.

International Search Report dated Oct. 8, 2013 in International Application No. PCT/US2013/049393.

* cited by examiner

FORGOTTEN ATTACHMENT DETECTION

BACKGROUND

E-Mail has become a common mode of communication in both personal and business settings. In many cases, a user intends to attach something to an email, such as a text document, a picture, a movie, a sound clip, a presentation, a scan, etc. Unfortunately, the user may be in such a hurry, or may be so distracted, or may be concentrating so much on the message, that the user forgets the attachment and just clicks "Send". Sometimes the user immediately notices the error and resends the email with the attachment. Other times the user gets a notice from one or more of the recipients that there was no attachment and the user then re-sends the email with the attachment. This double-transmission of the original message, one without the attachment, and one with the attachment, and the notices from recipients that there was no attachment, waste the time of the user and the recipients, and waste bandwidth on the communications media used to send the email.

SUMMARY

When a user begins creating a message, indicates that the message should be sent, or at some point in between, the message, such as but not limited to an email message, is examined to determine whether the message should likely include an attachment, such as a word processing document, a spreadsheet, a photograph, a scan, a music file, a video file, etc. If the message already has an attachment then the message can be sent without further inspection. If the message does not have an attachment then a subject line of the message and/or a body of the message is examined to determine the likelihood that the message should have an attachment.

If the subject line has at least one predetermined keyword then a suggestion is presented to the user that the message may need an attachment. If the user replies in the affirmative then the message is not sent and the user is allowed to add an attachment and/or to edit the message. If the user replies in the negative then the message is sent as originally composed by the user. The message may also be sent even if the user does not respond to the suggestion. The message may also be sent without user response if suggestions have been previously sent to the user.

If the subject line does not have any predetermined keywords, then the body of the message is examined by parsing the message to identify at least one sentence within the message. Each sentence is then examined for at least one predetermined word, at least one statistically significant phrase, or at least one template match. Based upon this examination, a score is generated that indicates the likelihood that the message should have an attachment.

If the score is greater than some predetermined value, then a suggestion is presented to the user that the message may need an attachment. If the user replies in the affirmative then the message is not sent and the user is allowed to add an attachment and/or to edit the message. If the user replies in the negative then the message is sent as originally composed by the user.

A database containing a list of predetermined keywords, predetermined phrases, and templates may be utilized to identify words in a message indicating that that a message should have an attachment. The database may be updated to add, remove, modify, or change the score of, keywords, phrases, and templates each time a message is sent.

The subject matter described herein may be implemented as a computer-controlled apparatus, a computer process, a computing system, or as an article of manufacture such as a computer-readable storage medium. These and various other features will be apparent from a reading of the following Detailed Description and a review of the associated drawing.

This Summary is a brief and/or simplified introduction to some of the concepts that are described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
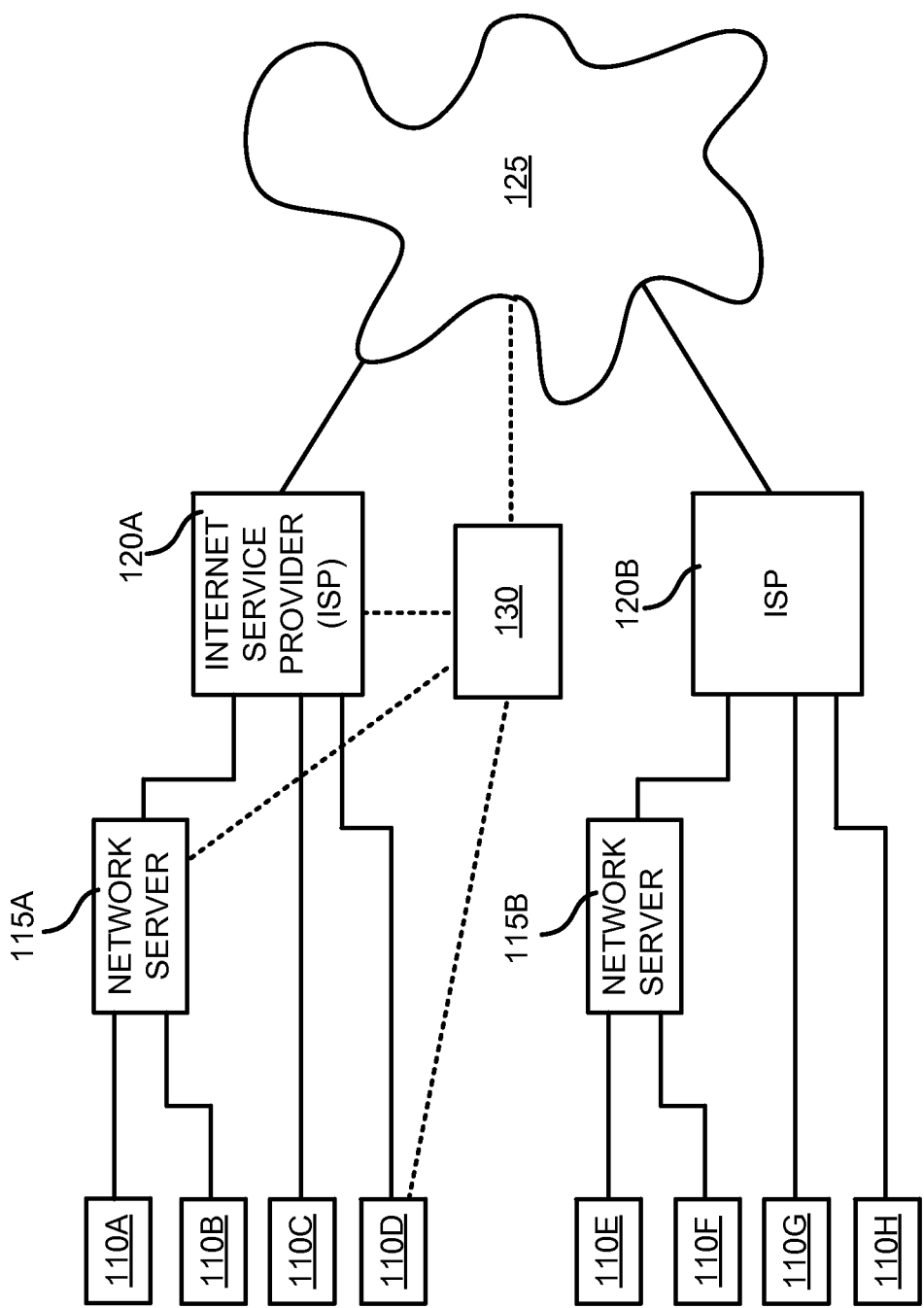
FIG. 1 illustrates an exemplary environment wherein a plurality of communication devices is connected via one or more of a network server, an Internet Service Provider (ISP), and a communications medium.

The following detailed description is directed to concepts and technologies for identification of messages or other documents that should have an attachment thereto. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawing, in which like numerals represent like elements throughout the several figures, aspects of a computing system, computer-readable storage medium, and computer-implemented methodology for forgotten attachment detection will be presented.

FIG. 1 illustrates an exemplary environment 10 wherein a plurality of subscriber communication devices 110A-110H is connected via one or more of a network mail server 115A, 115B, an Internet Service Provider (ISP) 120A, 120B, and a communications medium 125. One example of a network mail server is a server running the Microsoft Exchange Server® program. A subscriber communication device 110 may be, for example, a personal computer, a smartphone, a business computer, a tablet, or another type of computing device that executes one or more programs. A network server 115, or an ISP 120, is also a type of computing device. The communications medium 125 may be, for example, a local area network, a wide area network, the Internet, a WI-FI® connection, or some other communications medium which is capable of transferring data, including email messages and attachments, from one point to another.

Two subscriber devices 110 may communicate with each in a variety of ways, depending upon the environment in which each is operating. For example, they (e.g., 110A, 110B) may communicate via network mail server 115A if both are connected thereto, they (e.g., 110C, 110D) may communicate via an ISP 120A if both are connected thereto, they (e.g., 110E, 110G) may communicate via an network mail server 115B and an ISP 120B, and they (e.g., 110A, 110E) may communicate via the communications medium 125, typically via a network mail servers 115 and ISPs 120. There are four methods (or protocols) typically used for handling messages: "Exchange-enabled" (Microsoft Exchange Server® program), IMAP (Internet Message Access Protocol), POP (Post Office Protocol), and WebMail. Although there are significant differences in these protocols, the primary difference between these protocols, for the purposes of forgotten attachment detection, is how an email message is created. In an Exchange-enabled or POP system, there is an email client program on the user's computer whereby the user can create an email message, even if off-line. In IMAP and WebMail systems, however, the program whereby the user can create the message is on the server, so the user is connected to the mail server 115, generally by using a web browser program, in order to create an email message. These communication methods are merely exemplary, and are not limiting.

Figure 2A:
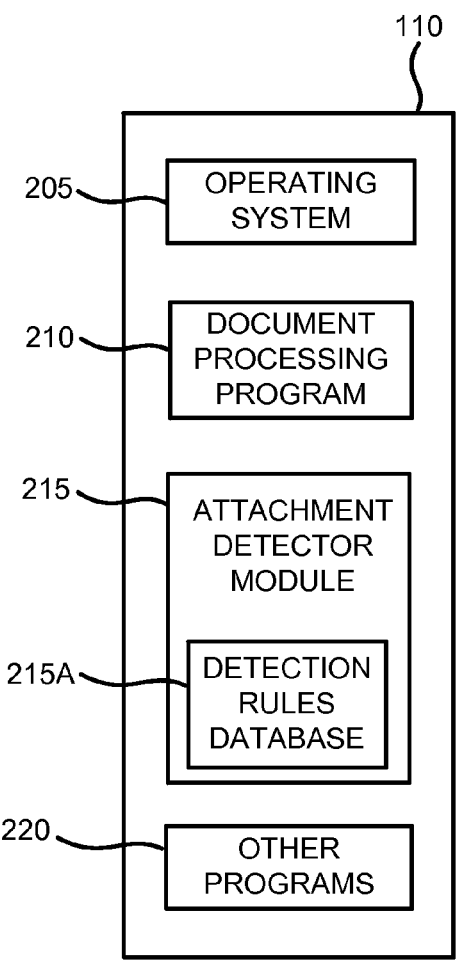
FIG. 2A illustrates an exemplary configuration of a subscriber communications device.

FIG. 2A illustrates an exemplary configuration of a subscriber communications device 110, such as subscriber communications device 110A. The device 110 has one or more programs or modules stored on it, such as an operating system 205, a document processing program 210 whereby a user can create a message, such as but not limited to an email program or an Internet browser program, such as where the network server 115 is an IMAP or webmail server, an attachment detection module 215 for performing the operations described herein, including, and/or including access to, a detection rules database 215A, and one or more other programs 220 such as but not limited to an Internet browser, a virus/malware detection and prevention program, a word processing program or a spreadsheet program, such as might be used to create an attachment, etc.

Figure 2B:
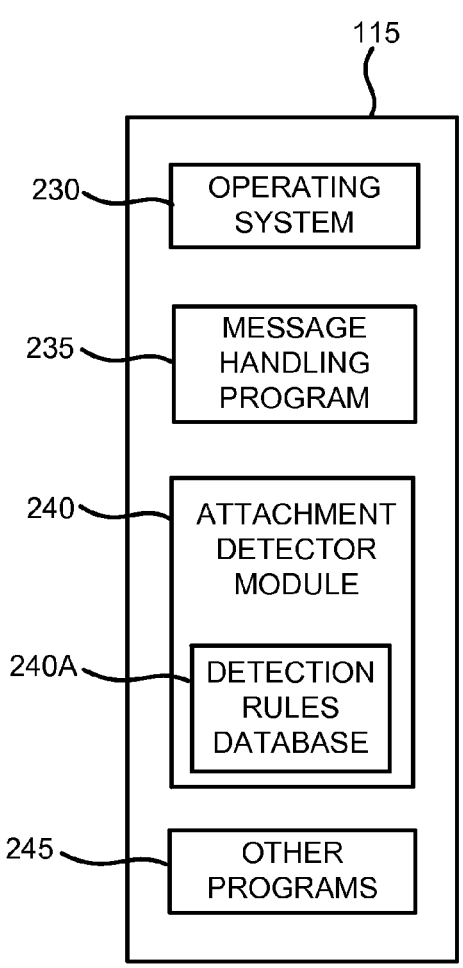
FIG. 2B illustrates an exemplary configuration of a network server or an ISP.

FIG. 2B illustrates an exemplary configuration of a network server 115. An ISP 120 might also utilize the configuration shown in FIG. 2. In one embodiment, the server 115 has one or more programs on it, such as an operating system 230, a message handling program 235 such as an email server, a program whereby a user can create a message, or other message-creation and/or handling host program, an attachment detection module 240 for performing the operations described herein, including, and/or including access to, a detection rules database 240A, and one or more other programs 245 such as but not limited to network security, server duty allocations, etc.

Referring briefly back to FIG. 1, also shown therein is a central data gathering system 130. Preferably, but not necessarily, the devices 110, 115, 120 which are running the attachment detection modules 215, 240 send information to the system 130 regarding user responses to suggestions that an attachment may be indicated, and regarding text that has been used when an attachment is already present in the message. This provides for updating and fine-tuning of the detection databases and rules described herein. Connection between the system 130 and the devices may be, by way of example and not of limitation, by the Internet or any other convenient communications media.

Figure 3:
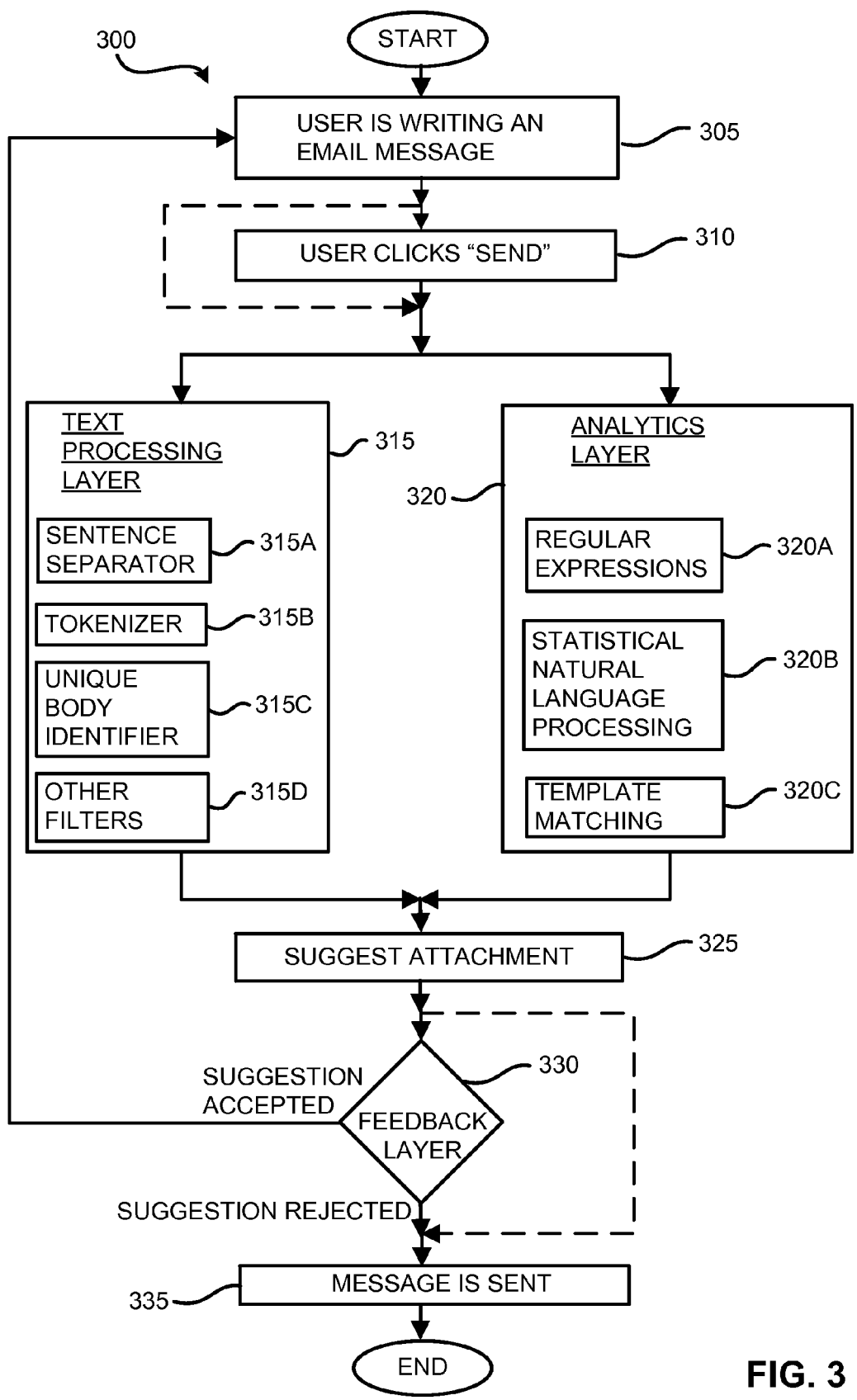
FIG. 3 illustrates an exemplary, brief, high-level flowchart illustrating a typical sequence of events for forgotten attachment detection.

FIG. 3 illustrates an exemplary, brief, high-level flowchart illustrating a typical sequence of events 300 for forgotten attachment detection. Several embodiments are shown. In one embodiment, a user is writing 305 a message, such as, but not limited to, an email, and the user clicks "SEND" 310. The message may then be analyzed using a text processing layer 315, an analytics layer 320, or both. These two layers are shown in parallel but, in an alternative embodiment, may be in series, with either one being first. In still another alternative embodiment, only one of these layers is used.

The text processing layer 315, which may have several modules, prepares the message for analysis and performs some limited initial analysis, for example: a sentence separator 315A, a "tokenizer" 315B, a "unique body" identifier 315C, and possibly other filtering or analysis routines 315D.

The analytics layer 320 analyzes the message using either a "regular expressions" analysis 320A, a statistical natural language processing analysis 320B, a template matching analysis 320C, any two of these, or all of these.

If text processing layer 315, the analytics layer 320, or both indicates that an email should have an attachment thereto, but does not, a suggestion to add an attachment is provided 325 to the user. If the feedback 330 from the user is that the suggestion is accepted, then the user is returned to the email process so that the user can attach a desired attachment to the e-mail message. If the feedback 330 from the user is that the suggestion to add an attachment is rejected, then the message is sent 335 as originally composed by the user.

In one alternative embodiment, indicated by the dashed line from operation 305 to operations 315 and 320, which bypasses operation 310, the text processing layer 315 and/or the analytics layer 320 begins when the user indicates a desire to create a new message, when the user indicates a desire to reply to a message, when the user begins writing 305 the message, when the user has written a predetermined number of characters, paragraphs, or lines, when the user first saves the message, and/or when the user opens a saved draft of the message, etc. The text processing layer 315 and/or the analytics layer 320 might also begin when the user attaches a document to the message, and that information can be used to update and/or fine-tune the detection rules database.

If either layer 315 or layer 320, or both, indicates that an email should have an attachment thereto, but does not, a suggestion to add an attachment is provided 325 to the user. This suggestion could be a suggestion that requires a response 330 from the user, as previously mentioned. In an alternative embodiment, however, the suggestion 325 could simply be via an informational message to the user, such as, but not limited to, a pop-up box which the user could just close or leave open as a reminder, or a pop-up box which would fade away after a minute or two. Similarly, with respect to FIGS. 4A and 4B, the analyses could begin at 406 or even 412 and the suggestion 416 and user response 418 would be treated as in 325 and 330. This alternative embodiment is also indicated by the dashed lines in FIGS. 4A and 4B. Similarly, with respect to FIG. 5, the analyses could begin at 502 or even 504, 506, 508, 510, 511 or 512, and the suggestion 416 would be treated as in 325 and 330.

If the user does indicate "Send" in response 330 to the suggestion 325, then, as the user has previously been provided with suggestions that an attachment may be indicated, the message may simply be sent without further notice to the user. Alternatively, even if the user has already been provided with suggestions that an attachment may be indicated, if the analyses still indicate that there should be an attachment when the user presses "Send", then any pop-up box could be brought to the forefront, or the suggestion could be sent again to the user, with or without requiring a response from the user.

In one embodiment, the message is held until the user provides feedback 330 as to whether the suggestion for an attachment is accepted or rejected. In an alternative embodiment, if the user does not respond to the suggestion that there should be an attachment within a predetermined amount of time, then the message may be sent, even without user feedback, as indicated by the dashed line from operation 325 to operation 335 which bypasses operation 330.

Figure 4A:
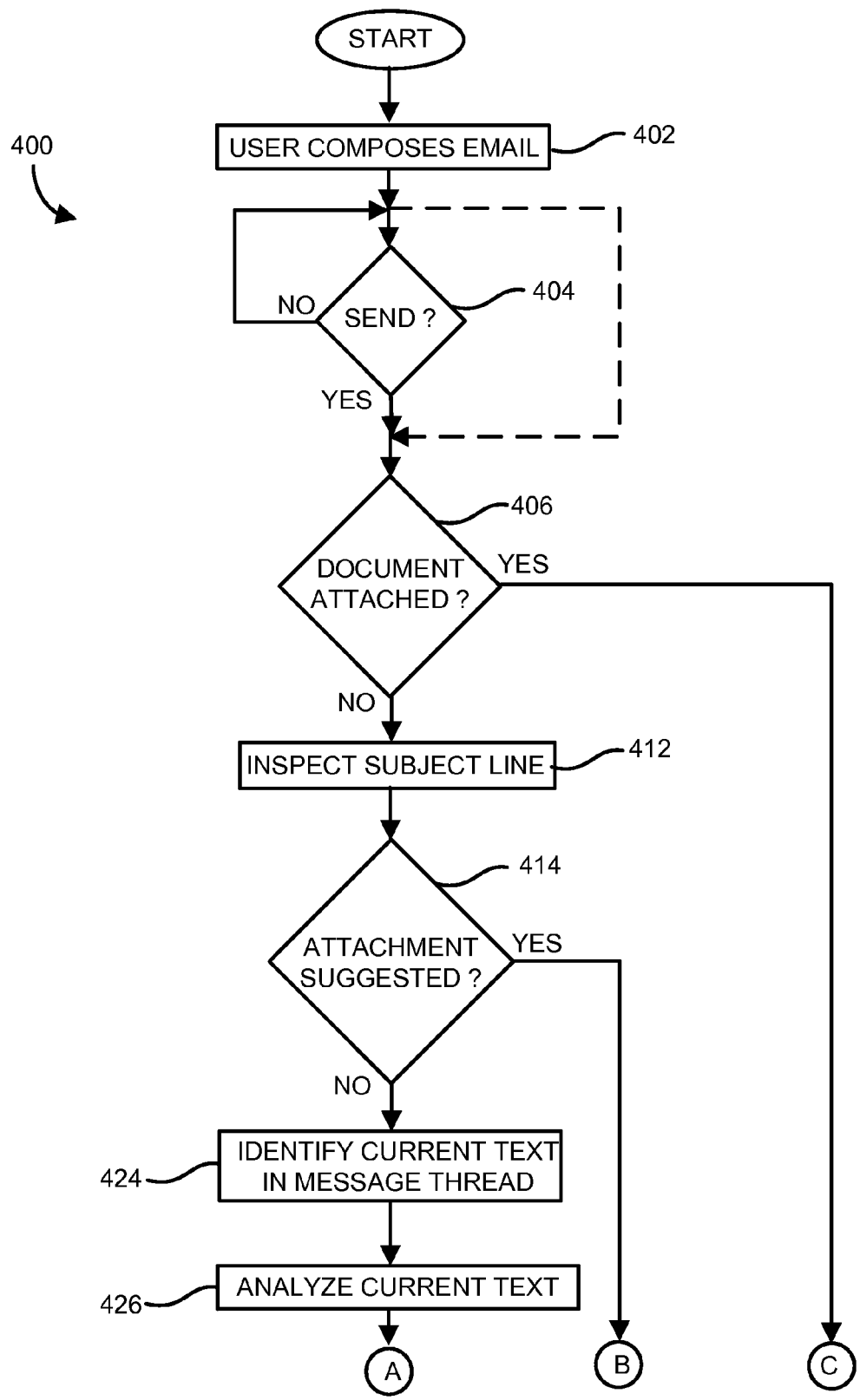
FIGS. 4A-4B are a flowchart showing an exemplary procedure illustrating the operation of an attachment detection module.
Figure 4B:
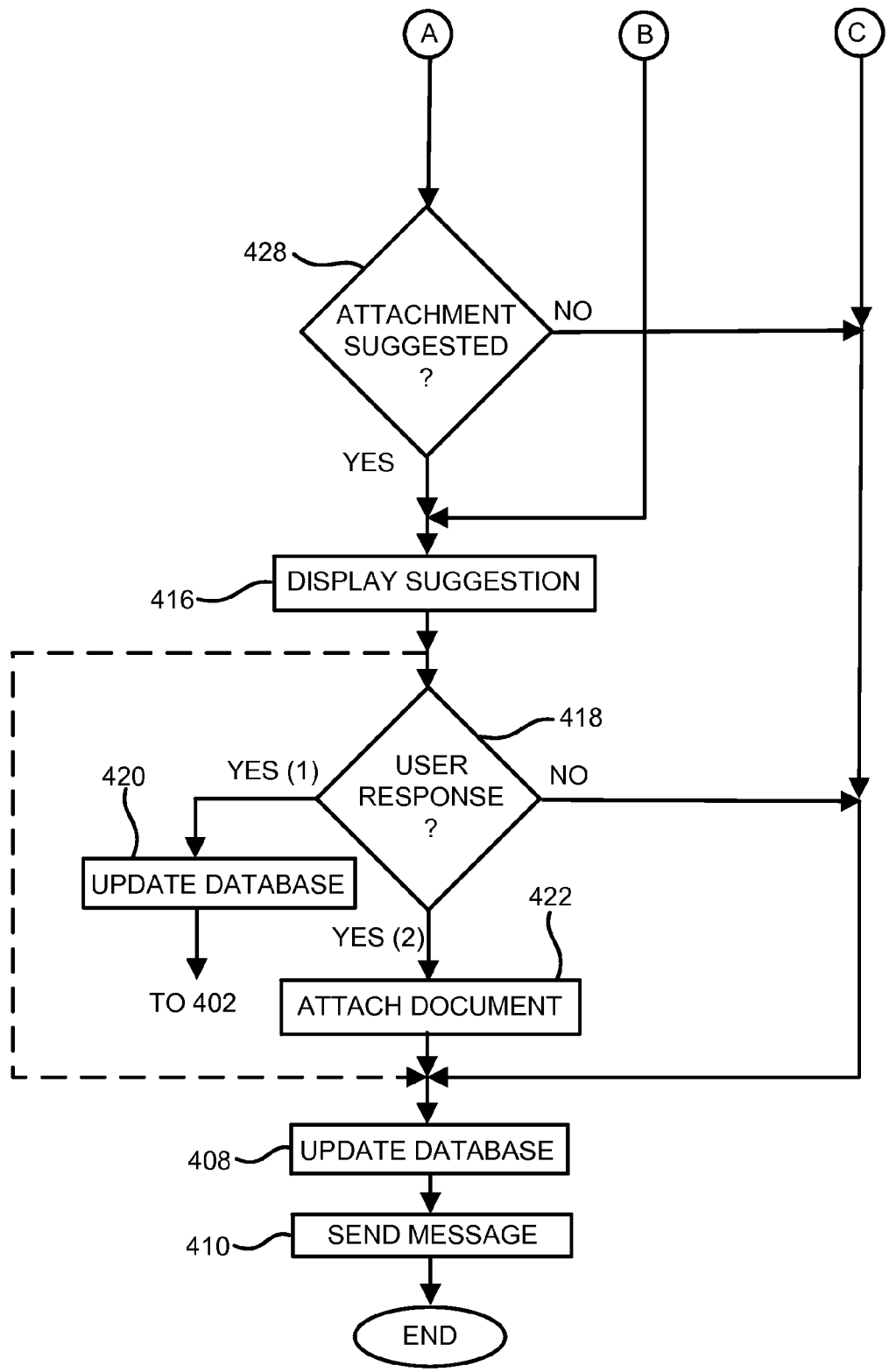

FIGS. 4A-4B are a flowchart of an exemplary procedure 400 illustrating the operation of an attachment detection module. The operations of the procedure 400 and the other procedures disclosed herein are not necessarily presented in any particular order and that performance of some or all of the operations in an alternative order(s) is possible and is contemplated. The operations have been presented in the demonstrated order for ease of description and illustration. Operations may be added, omitted, performed simultaneously, or performed in another order without departing from the scope of the appended claims.

Also, the illustrated procedure can be ended at any time and need not be performed in its entirety. Some or all operations of the procedure, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The attachment detection module 215, 240 may be in the communications device 110, may be in the network server 115, may be in the ISP 120, or any combination thereof. For example, the device 110 may have the module 215 in it. Alternatively, if multiple devices 110 are connected to a network server 115, such as in a company, then it may be desirable to only have the attachment detection module 240 on the server 115, in addition to, or instead of, being on the devices 110. Similarly, it may be desirable for an ISP 120 to have the attachment detection module 240 to reduce the traffic and use of ISP resources caused by a first email message that failed to include an indicated attachment, one or more reply emails indicating that there was no attachment, and a further email including the attachment. For brevity of discussion, the operation of attachment detection module 215 will be discussed, it being understood that attachment detection module 240 performs the same function. The attachment detection modules 215, 240 are preferably modules or plug-ins within another program, such as an email program 210, 235, but the attachment detection could also be implemented as a separate program.

The procedure 400 begins at operation 402, where a user is composing a document, such as but not limited to an e-mail message, using a document processing program 210, or using a web browser program which is in communication with the message handling program 235 in the network server or ISP. Once the user is finished, the user will indicate that the user wishes the document to be sent, such as by clicking on a button such as, but not limited to, a "SEND" button, clicking on a "SEND" command on a drop-down menu, touching a "SEND" icon on a touchscreen, or some other action. It will be noted that, in some cases, a user may inadvertently signal a "SEND" instruction by accidentally clicking on, selecting, or touching a "SEND" button, command, or icon, such as when the user really meant to "SAVE" the draft of the message.

At operation 404, the "SEND" instruction signal is detected by the document processing program 210, or by the attachment detection module 215. In response thereto, the attachment detection module 215 examines the document to determine whether something is already attached to the document at operation 406. For example, if the document is an email, then a picture, video, sound clip, text document, spreadsheet document, clip art, "v-Card", etc., may be attached. In alternative embodiment, as indicated by the dashed line between operations 402 and 406 which bypasses operation 404, and as previously discussed, a "SEND" instruction is not required for the document processing program 210 to begin analysis 406. For convenience of discussion below, such as to distinguish a document produced by the document processing program 210 or the message handling program 235 from a document which may be attached thereto, the document produced by a document processing program 210 or message handling program 235 will be referred to as a "message" and any attached document, such as might be produced by a word processing, spreadsheet, or other program 220, will be referred to as a "document".

If there is a document attached to the message then the attachment detection module 215 will preferably, but not necessarily, update its detection rules database at operation 408, and will allow the message and attached document to be sent, as originally composed by the user, at operation 410, or will allow the message and attached document to be passed on to another program, such as a spellchecker program, metadata removal program, or virus inspection program, for further processing before being sent.

If desired, even when there is already an attachment, the detection rules database may be updated by running the analyses operations 412, 424, and/or 426 that are described below. This provides additional assurance that the current detection rules database is satisfactory, and/or fine-tunes the database to identify where an attachment may be desired even when the current detection rules database might not have suggested that there should be an attachment.

If a document is not attached to the message then the attachment detection module 215 will examine the "Subject" line (sometimes called a "title") of the message at operation 412 to determine whether there should be an attached document. This may be accomplished by searching the subject line for the presence of one or more keywords. Some examples of keywords are, but are not limited to, attach, attached, enclose, enclosed, enclosure, appended, appendix, document, presentation, article, graph, etc. Other keywords might also be utilized.

If, at operation 414, it is determined that the subject line indicates that there should be an attachment, then the module 215 displays a dialog box or other type of user interface element to the user at operation 416, whereby the user is asked whether there should be an attachment to the message that is being composed. The dialog box may be, for example, "Should there be an attachment?", or "The message suggests that an attachment should be included.", or other such dialog. The dialog box may have buttons, icons, a pull-down menu or other type of user interface element, which allow the user to respond, such as "Yes, there is an attachment.", "Yes, I would like to add an attachment.", "No, there is no attachment.", "Send anyway.", "No, and don't ask again.", etc.

If the user response at operation 418 is negative (for example, no attachment, send anyway, don't ask again) then the module 215 will preferably, but not necessarily, update its detection rules database at operation 408, and will allow the message to be sent, as originally composed by the user, or will allow the message to be passed on to another program, such as a spellchecker program, metadata removal program, or virus inspection program, for further processing before being sent. This occurs at operation 410.

If the user response at operation 418 is positive (e.g., the user wants to attach something to the message), then the module 215 will preferably, but not necessarily, update its detection rules database at operation 420, and return the user to the document preparation program 210 where the user can attach a document, edit the message, etc.

At operation 418, the module 215 may also present a dialog box or other type of user interface element which, rather than returning the user to the document preparation program 210, allows the user to directly select the document to be attached at operation 422. Once a document is attached then the module 215 will preferably, but not necessarily, update its detection rules database at operation 408, and will allow the message and attached document to be sent, or will allow the message and attached document to be passed on to another program, such as a spellchecker program, metadata removal program, or virus inspection program, for further processing before being sent.

In an alternative embodiment, as previously discussed, a user response 418 is not required, as indicated by the dashed line between operations 416 and 408, and as previously discussed above.

If, at decision operation 414, the subject line did not indicate that a document should be attached, then the module 215 will begin a more detailed analysis of the message. It will be appreciated that a message, especially an email message, may not be an independently-created and totally new message, but may contain text from one or more previous email messages therein. For example, the message being created by the user may be the latest message in a thread of messages. An earlier message in the thread may refer to an attachment, and the user may want to "REPLY" or "REPLY TO ALL" to acknowledge receipt of the message, to offer comments about the content of the earlier message or about the attachment to the earlier message, to indicate that an earlier message did not have an indicated attachment, etc., but may not want to attach anything to the reply message.

Therefore, preferably, but not necessarily, the module 215 inspects 424 the message to identify and distinguish (unique body identifier 315C in FIG. 3) the unique body in the message; that is, to identify and distinguish the current text from older text in the message thread. This can be done by, for example, and not by way of limitation, searching the text in the message for such words as "Subject", "From", "To", "Sent", "Subject: RE:", "Subject: FWD:", etc. In one type of email message program, the new text is added above the previous text in the thread, so that one reads the thread chronologically from bottom to top, but one reads individual messages within the thread from top to bottom. In this case, such words typically indicate that the text below (following) those words is from a previous message and, in that case, the text after such a word or words is not considered.

In another type of email message program, the new text is added below the previous text in the thread, so that one reads the entire thread from top to bottom. In this case, such words typically indicate that the text above (preceding) the lowest "TO" or "FROM" or "SUBJECT" line is from a previous message and, in that case, such text is not considered. Alternatively, the document processing program 210 may insert a unique character or code into the message when the user clicks "REPLY" or "REPLY TO ALL" and the module 215, upon detecting that character or code, would know that the text above (or below) that character is the new text.

Once the current text portion of the message has been identified then the module 215 analyzes this portion at operation 426 to determine whether an attachment is suggested. This determination is discussed in detail below with respect to FIG. 5. If the analysis performed at operation 426 indicates 428 that an attachment is suggested then, as discussed above, the module 215 displays a dialog box or other type of user interface element to the user at operation 416, whereby the user is asked whether there should be an attachment to the e-mail message.

If the analysis performed at operation 426 does not indicate 428 that an attachment is suggested, then the module 215 will preferably, but not necessarily, update its detection rules database at operation 408, and will allow the message, as originally composed by the user, to be sent at operation 410, or will allow the message to be passed on to another program, such as a spellchecker program, metadata removal program, or virus inspection program, for further processing before being sent.

Other filters (component 315D of FIG. 3) may also be also be present and rely on other rules, keywords, and/or phrases to overrule an indication from a different filter which has determined that an attachment should be included. For example, the phrase "attached garage" uses the keyword "attached" and would indicate that an attachment should be included. The negative filter "attached garage" would, however, overrule that indication. Other such negative filter phrases include, for example, "attached to my house", "attached fence", "enclosed yard", "enclosed garden", etc.

Figure 5:
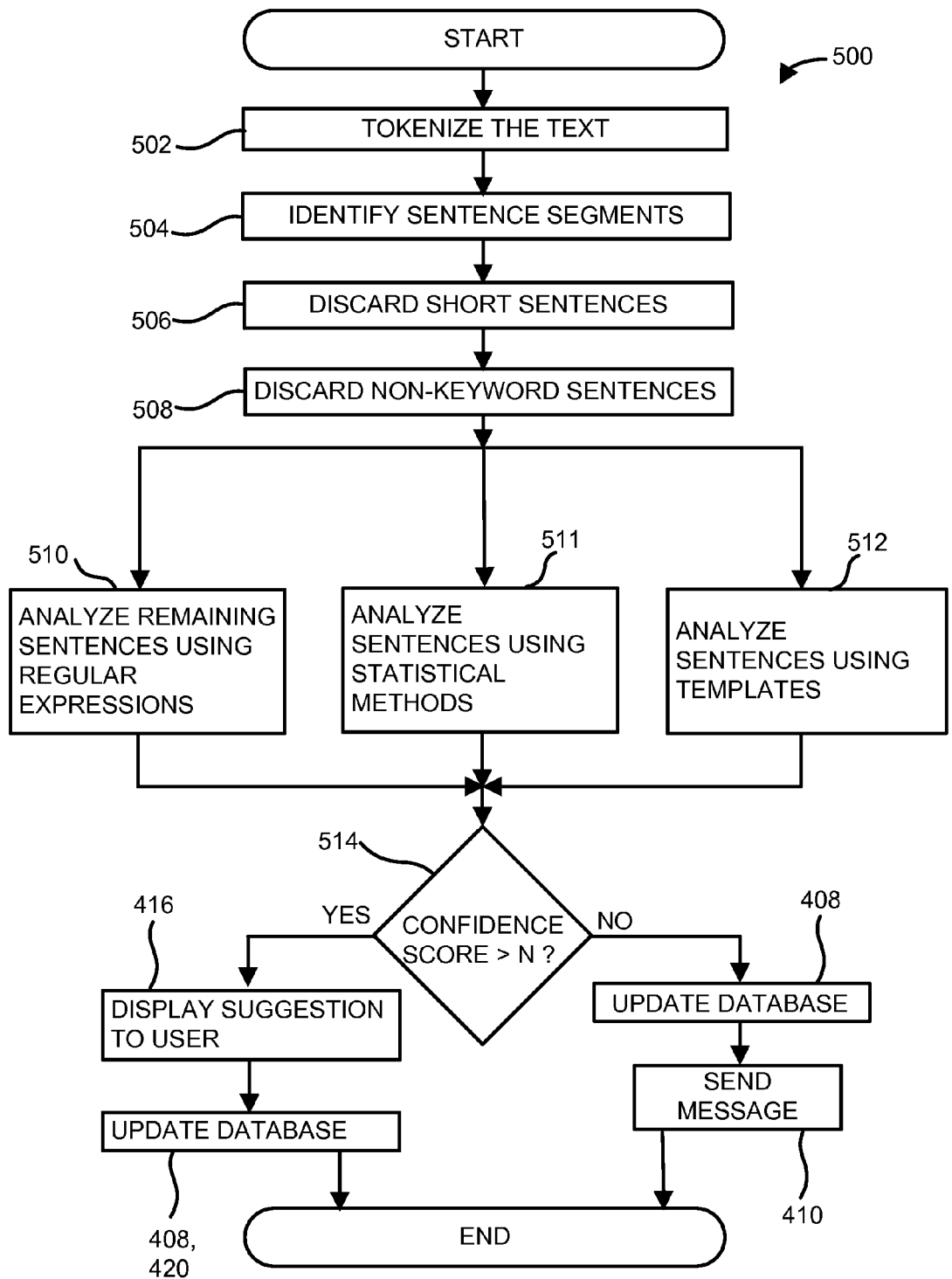
FIG. 5 illustrates an exemplary procedure for analyzing the text of a message to determine whether it is likely that the message should have an attachment thereto.

FIG. 5 illustrates an exemplary procedure 500 for analyzing the current text in a message to determine whether it is likely that the message should have an attachment thereto. The procedure 500 begins at operation 502, where the text is "tokenized" by identifying each part of the text as being either a word or punctuation. The punctuation characters are then analyzed at operation 504 to identify sentence segments by locating sentence separators. For example, a period (".") is often used as a sentence separator. A period, however, also could be the decimal point in a number, part of an email address, or part of a website URL. If a period is being used as a sentence separator, however, it will typically be followed by one or more spaces, or by a paragraph mark (sometimes formerly known as a "carriage return"). Some users do not use periods, or do not consistently use periods, to indicate the end of a sentence and so a paragraph mark can also be used to identify the end of a sentence, especially when there are two or more paragraph marks with no intervening characters, or only one or more intervening space characters between the paragraph marks.

Once the words have been separated into sentences, then short sentences are preferably "discarded" at operation 506, i.e., they are not further analyzed. For example, "Hi Bob." and "Thanks!" would be discarded. Also, sentences that do not contain one or more keywords may be discarded at operation 508, at least with respect to regular expression analysis 510 of FIG. 5. Some examples of keywords are, but are not limited to, attach, attached, enclose, enclosed, enclosure, appended, appendix, document, presentation, article, graph, etc. For example, "We are writing to inquire as to the status of our order of May 1, 2012." And "As you may know, the price of fuel directly affects shipping costs." would be discarded. The remaining sentences are then candidates for further analysis. The further analysis preferably, but not necessarily, has two components, which may be conducted in parallel, in series in either order, or only using either of the components.

One component of the further analysis is a "regular expression" analysis (operation 320A of FIG. 3) which generates at operation 510 a "confidence" score. The confidence score is a rating which indicates how likely it is that the sentence indicates that an attachment should be included. The confidence score may be any desirable and convenient scale, such as from 1 (extremely unlikely) to 5 (extremely likely), or A to E, etc. Other scales, e.g., 1 to 10, or 1 to 100, may also be used.

The "regular expression" analysis is a rule-based analysis and, preferably but not necessarily, looks for expressions that only generate a high degree of confidence. For example, "The attached file . . . ", "Attached is . . . ", "Attached are", "A copy is attached.", "Copies are attached.", "The enclosed document . . . ", etc.

Another component of the further analysis is a statistical analysis (operation 320B of FIG. 3) at operation 511, which also generates a "confidence" score. For example, the root term "attach" or "enclos" is within one, two or even N words of the word "file" or the word "document", such as in "As you will note from the file which I am attaching . . . ". As another example, "As can be seen from our advisory notice, your order of May 1, 2012 has been shipped." In the second example, neither "attach" nor "enclose", nor even "document" is used, so the "regular expression" analysis would not indicate that an attachment is likely, but the statistical analysis would indicate that an attachment is likely based on the phrase "As can be seen". It may also be preferable for operation 511 to be performed on the non-keyword sentences which were discarded at operation 508.

The statistical analysis can be based upon monitoring the feedback from a particular user, monitoring the feedback from multiple users, by, for example, system 130 of FIG. 1, or a combination of both. For example, if the statistical analysis finds a particular phrase and determines that it is likely that there should be an attachment and asks the user about the attachment, but the user consistently (or at least most of the time) replies and indicates that there is no attachment, then the confidence level when that phrase appears will be decreased and/or that phrase may be removed from the statistical analysis, at least for that user. Note that a phrase may have a high confidence that there should be an attachment for most users but, based upon the feedback from a particular user, may indicate low confidence of an attachment with respect to that particular user. It will be appreciated that some text strings may satisfy both the regular expression analysis and the statistical analysis.

In addition, a user may, if desired, add words or phrases that the user normally uses when an attachment is indicated. For example, the user may often use "paper", or "evidence", or some shorthand term instead of "attachment" or "enclosure". Preferably, but not necessarily, this information would be used to update the statistical analysis for other users.

Another component of the further analysis is a template matching analysis (operation 320C of FIG. 3) at operation 512, which can also generate a "confidence" score. Template matching is similar to, but not identical to, phrase checking An example of a template is "please <word #1> the attached <word #2>", where <word #1> would be a verb if it is to match the template, and <word #2> would be a noun if it is to match the template. Preferably, but not necessarily, the database would contain a list of acceptable verbs and acceptable nouns for this template. Other templates might use different verbs and nouns. Thus, for example, if the text in the message was "please review the attached document", then "review", being a verb, would meet the <word #1> requirement and "document", being a noun, would meet the <word #2> requirement. This would therefore indicate confidence that the user intended the message to have an attachment. In contrast, however, if the text in the message was, for example, "please ignore the attached dilapidated garage", then "ignore" would be a verb, but preferably not a verb on the verb list in the database, and "dilapidated" is an adjective, not a noun, so this would indicate that this phrase does not indicate that the user intended the message to have an attachment. Other templates, verb listings, and noun listings are possible and contemplated. Templates are preferably, but not necessarily, updated based upon user response to the suggestion that the message should have an attachment.

A response from a user (e.g., "Yes, I want to add an attachment" or "No, I do not want to add an attachment") at operation 418 to a displayed question at operation 416 (e.g., "Is there an attachment for this message?") is preferably, but not necessarily, sent by the module 215 to the central data gathering system 130 of FIG. 1 which views the responses of multiple users to update and fine-tune both the regular expressions database and the statistical analysis database. These updated databases can then be sent to the devices running the module 215, 240.

At operation 514, a determination is made as to whether the confidence score from either the regular expression analysis or the statistical analysis is above a threshold value. For example, above "4" on a scale of 1 to 5 provides confidence that there should be an attachment. The threshold value is not critical, and need not be an integer value, but it will be appreciated that as the threshold value increases the likelihood of a false attachment suggestion will decrease, but the likelihood will increase that an email needing an attachment will be sent without an attachment. Conversely, it will be appreciated that as the threshold value decreases the likelihood of a false attachment suggestion will increase, but the likelihood will decrease that an email needing an attachment will be sent without an attachment.

If at operation 514, the confidence score of either, or both, analysis is above the threshold then a dialog box or other type of user interface element is displayed at operation 416 to the user asking whether there should be an attachment and the database is preferably, but not necessarily, updated at operation 408 or 420, depending upon the response of the user. If at operation 514 the confidence score of both analyses is below the threshold then the database is preferably, but not necessarily, updated at operation 408 and then the message is sent, as originally composed by the user, at operation 410.

It may happen that the document processing program 210 is on the computer device 110, but the attachment detection module is running on server 115 or ISP 120. In this environment the device 115, 120, upon detecting that an attachment is suggested, will hold the message until a response is received from the user and, if the user indicates that the user wishes to attach a document to the message, the device 115, 120 will move, or cause to be moved, the message from the user's "OUT" folder or "SENT" folder to the user's "DRAFT" folder for further processing by the user.

Although the operations, modules, and components mentioned herein have made reference to an email program, they are not limited to such use. They may be used, with little or no modification, on any communication that might be configured to include an attachment. One type of such communication is, for example, an SMS (Short Message System) message in an SMS system which allows attachments. Another example is where a user may be providing personal or order information on a web page of a company, and the web page allows, but does not require, the user to attach a document. Then, when the user clicks on, for example, a "Submit" button, the completed web page and any specified attachment is saved and/or sent to a specified electronic address within the company. The operations, modules, and components mentioned herein may be used to look for keywords and/or phrases in the text fields completed by the user in order to determine whether the user may have forgotten to include an attachment.

Also, although the discussion herein referred to user input in the form of clicking a button, or pressing an icon, etc., other forms of user input are expected and contemplated. The user may also indicate instructions by voice or by gesture. For example, the user could say "Send", or "Send without attachment" or "no attachment" or "add attachment" or "attachment needed", and voice recognition software would interpret and implement the voice command. As another example, the user could gesture to the right to indicate "Send", or "Send without attachment" or "no attachment" and gesture to the left to indicate "add attachment" or "attachment needed", and motion detection software would interpret and implement the gesture.

Figure 6:
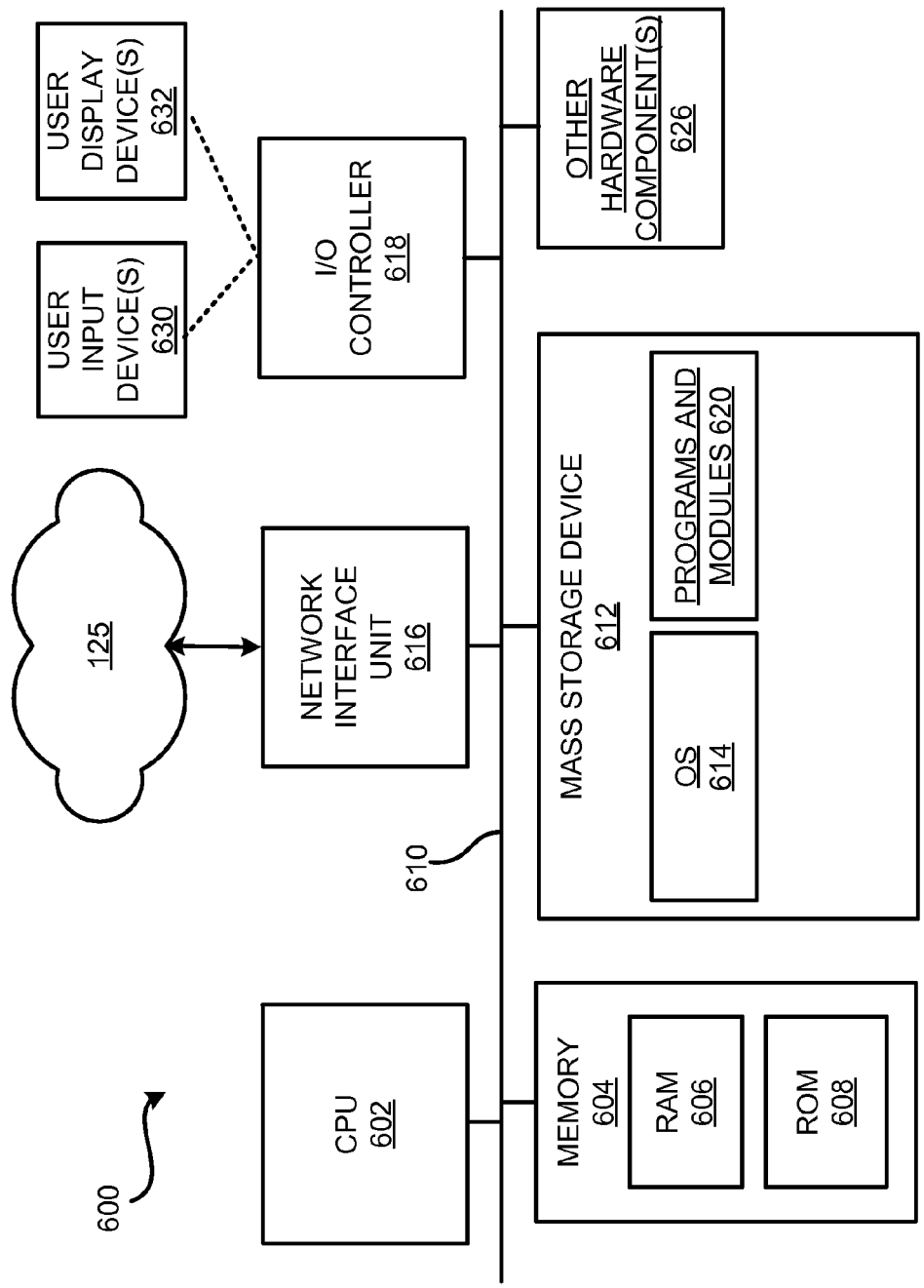
FIG. 6 illustrates exemplary computer architecture for devices capable of performing as described herein.

FIG. 6 illustrates exemplary computer architecture 600 for devices 110, 115, 120, 130 capable of performing as described herein. Thus, the computer architecture 600 illustrates an exemplary architecture for a server computer, mobile phone, a PDA, a smart phone, a desktop computer, a netbook computer, a tablet computer, and/or a laptop computer. The computer architecture 600 may be utilized to execute any aspects of the software operations presented herein.

The exemplary computer architecture 600 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing the operating system 614 and one or more programs or modules 620, such as the modules described above with regard to FIGS. 1-5.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a hard disk or CD-ROM drive, those skilled in the art will appreciate that computer-readable media can be any available computer storage media or communication media that can be accessed by the computer architecture 600.

Although the memory 604 and mass storage device 612 are preferably separate components, the memory 604 could be included in a mass storage device 612. The memory 604 and mass storage device 612 may be collectively considered to be, and referred to as, a memory device.

Other hardware components 626 may also be present. For example, a sensor component, such as a magnetometer, an ambient light sensor, a proximity sensor, an accelerometer, a gyroscope, a global positioning system (GPS) sensor, a microphone or other audio input device, a camera, etc. may be present.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium" and variations thereof, does not include waves, signals, and/or other transitory and/or intangible communication media, per se.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above are also included within the scope of computer-readable media.

According to various embodiments, the computer architecture 600 may operate in a networked environment using logical connections to remote computers and/or servers through a network such as the network 125. The computer architecture 600 may connect to the network through a network interface unit 616 connected to the bus 610. The network interface unit 616 also may be utilized to connect to other types of networks and remote computer systems. The computer architecture 600 also may include an input/output controller 618 for receiving and processing input from one or more user input devices 630 such as, but not limited to, a keyboard, mouse, touchscreen, touchpad, keypad, or electronic stylus (shown in dashed lines in FIG. 6). Similarly, the input/output controller 618 may provide output to one or more user display devices 632 such as, but not limited to, a display screen, a printer, or other type of output device (also shown in dashed lines in FIG. 6). A user input device 630 and a user output device 632 may be embodied in the same component, such as a touch-sensitive screen. The user input device 630 and the user output device 632 may be integral with a device, such as in the case of a handheld device, or may be separate components, such as a keyboard, mouse and display used with many desktop systems.

The software components described herein, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. The CPU 602 may be a single processor, or may be a plurality of processors. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, many types of physical transformations take place in the computer architecture in order to store and execute the software components presented herein. Also, the computer architecture may include other types of computing devices, including hand-held computers, embedded computer systems, personal digital assistants, and other types of computing devices known to those skilled in the art. It is also contemplated that the computer architecture may not include all of the components shown herein, may include other components that are not explicitly shown herein, or may utilize an architecture completely different than that shown herein.

The subject matter described above is provided by way of illustration only and are not to be construed as limiting. Various modifications and changes may be made to the subject matter described herein without following the exemplary embodiments and applications illustrated and described herein. Although the subject matter presented herein has been described in language specific to computer structural features, methodological and transformative acts, specific computing machinery, and computer readable media, it is to be understood that the appended claims are not necessarily limited to the specific features, acts, or media described herein. Rather, the specific features, acts and mediums are disclosed as example forms of implementing the claims.

The invention claimed is:

1. In an environment wherein electronic messages may be sent with or without an attachment, a method for determining whether an electronic message suggests that there should be an attachment, the message having a subject line and a body, the method comprising:
   inspecting a message to determine whether the message already has an attachment;
   if the message does not already have an attachment then inspecting the subject line of the message or the body of the message to determine a likelihood that the message should have an attachment; and
   if the subject line of the message or the body of the message indicates that the message should have an attachment then providing a suggestion to a user that the message may need an attachment;
   wherein inspecting the subject line of the message comprises:
   searching the subject line of the message for presence of at least one predetermined keyword, if at least one predetermined keyword is present, then providing the suggestion, and
   if no predetermined keyword is present, then inspecting the body of the message, and
   wherein inspecting the body of the message comprises:
   parsing the message to identify at least one sentence within the message,
   inspecting the at least one sentence for at least one of presence of at least one predetermined word, for presence of at least one statistically significant phrase, or at least one template match, to generate a score indicating the likelihood that the message should have an attachment, and
   if the score is greater than a predetermined score, then providing the suggestion.

2. The method of claim 1 wherein parsing the message comprises:
   searching the message for the presence of at least one predetermined character; and
   if at least one predetermined character is present then identifying the at least one sentence in the message as text in the message which precedes the at least one predetermined character.

3. The method of claim 1 wherein the body of the message includes current text and text of previous messages and further comprising, prior to inspecting the body of the message to determine the likelihood that the message should have an attachment, distinguishing the current text from the text of previous messages, whereas only the current text in the body of the message is inspected to determine the likelihood that the message should have an attachment.

4. The method of claim 1 wherein inspecting the at least one sentence for the presence of at least one predetermined word to generate a score indicating the likelihood that the message should have an attachment comprises:

retrieving at least one keyword from a database of keywords; and inspecting the at least one sentence for the presence of the at least one keyword.

5. The method of claim 1 wherein inspecting the at least one sentence for the presence of at least one statistically significant phrase to generate a score indicating the likelihood that the message should have an attachment comprises:

retrieving at least one phrase from a database of phrases; and inspecting the at least one sentence for the presence of the at least one phrase.

6. The method of claim 1 and further comprising:

consulting a database of predetermined keywords and predetermined phrases; and after inspecting the at least one sentence for the presence of at least one predetermined keyword or at least one predetermined phrase, updating the database based upon the indication from the user whether the suggestion is accepted or is rejected.

7. The method of claim 1 and further comprising, prior to inspecting a message, receiving an indication from the user to send the message.

8. The method of claim 1 and further comprising, after providing the suggestion, accepting an indication from the user whether the suggestion is accepted or is rejected.

9. In an environment wherein electronic messages may be sent with or without an attachment, a message having a subject line and a body, a computing device comprising:

a memory device containing instructions for an operating system and at least a document processing program;

a network interface unit;

a user input and display device;

a processor communicatively coupled to the memory device, to the user input and display device, and to the network interface unit, the processor executing the instructions to:

inspect a message to determine whether the message already has an attachment;

if the message does not already have an attachment then to inspect the subject line of the message or the body of the message to determine a likelihood that the message should have an attachment; and if the subject line of the message or the body of the message indicates that the message should have an attachment then to provide a suggestion to a user via the user input and display device that the message may need an attachment;

wherein to inspect the subject line of the message comprises:

to search the subject line of the message for presence of at least one predetermined keyword;

if at least one predetermined keyword is present, then to provide the suggestion;

if no predetermined keyword is present, then to inspect the body of the message; and wherein to inspect the body of the message comprises:

to parse the message to identify at least one sentence within the message;

to inspect the at least one sentence for at least one of presence of at least one predetermined word, presence of at least one statistically significant phrase, or at least one template match, to generate a score to indicate the likelihood that the message should have an attachment; and if the score is greater than a predetermined score, then to provide the suggestion.

10. The computing device of claim 9 wherein the processor parses the message by further executing the instructions to:

search the message for the presence of at least one predetermined character;

if at least one predetermined character is present then to identify the at least one sentence in the message as text in the message which precedes the at least one predetermined character.

11. The computing device of claim 9 wherein the body of the message includes current text and text of previous messages and wherein, prior to inspecting the body of the message to determine the likelihood that the message should have an attachment, the processor executes the instructions to distinguish the current text from the text of previous messages, and to inspect only the current text in the body of the message to determine the likelihood that the message should have an attachment.

12. The computing device of claim 9 wherein the memory device further comprises a database of keywords, and wherein the processor executes the instructions to inspect the at least one sentence for the presence of at least one predetermined word to generate a score indicating the likelihood that the message should have an attachment by executing instructions to:

retrieve at least one keyword from a database of keywords; and inspect the at least one sentence for the presence of the at least one keyword.

13. The computing device of claim 9 wherein the memory device further comprises a database of phrases, and wherein the processor executes the instructions to inspect the at least one sentence for the presence of at least one statistically significant phrase to generate a score indicating the likelihood that the message should have an attachment by executing instructions to:

retrieve at least one phrase from a database of phrases; and inspect the at least one sentence for the presence of the at least one phrase.

14. The computing device of claim 9 wherein the memory device further comprises a database of phrases, and wherein the processor executes the instructions to:

consult a database of predetermined keywords and predetermined phrases; and after the processor executes the instructions to inspect the at least one sentence for the presence of at least one predetermined keyword or at least one predetermined phrase, the processor further executes the instructions to update the database based upon an indication from the user whether the suggestion is accepted or is rejected.

15. In an environment wherein electronic messages may be sent with or without an attachment, a message having a subject line and a body, a computer storage medium being one of an optical disk, a solid state storage device, or a magnetic storage device, and having computer readable instructions stored thereupon that, when executed by a computer, cause a computer to:

inspect a message to determine whether the message already has an attachment;

if the message does not already have an attachment then to inspect the subject line of the message or the body of the message to determine a likelihood that the message should have an attachment; and if the subject line of the message or the body of the message indicates that the message should have an attachment then to provide a suggestion to a user that the message may need an attachment;

wherein to inspect the subject line of the message comprises:
to search the subject line of the message for presence of at least one predetermined keyword;
if at least one predetermined keyword is present, then to provide the suggestion;
if no predetermined keyword is present, then to inspect the body of the message; and wherein to inspect the body of the message comprises:
to parse the message to identify at least one sentence within the message;
to inspect the at least one sentence for at least one of presence of at least one predetermined word, presence of at least one statistically significant phrase, or at least one template match, to generate a score to indicate the likelihood that the message should have an attachment; and
if the score is greater than a predetermined score, then to provide the suggestion.

16. The computer storage medium of claim 15 wherein the instructions further cause the computer to:
search the message for the presence of at least one predetermined character;
if at least one predetermined character is present then to identify the at least one sentence in the message as text in the message which precedes the at least one predetermined character.

17. The computer storage medium of claim 15 wherein the body of the message includes current text and text of previous messages and wherein the instructions further cause the computer, prior to inspecting the body of the message to determine the likelihood that the message should have an attachment, to distinguish the current text from the text of previous messages, and to inspect only the current text in the body of the message to determine the likelihood that the message should have an attachment.

18. The computer storage medium of claim 15 wherein the memory device further comprises a database of keywords, and wherein the instructions to cause the computer to inspect the at least one sentence for the presence of at least one predetermined word to generate a score indicating the likelihood that the message should have an attachment cause the computer to:
retrieve at least one keyword from a database of keywords; and
inspect the at least one sentence for the presence of the at least one keyword.

19. The computer storage medium of claim 15 wherein the memory device further comprises a database of phrases, and wherein the instructions to cause the computer to inspect the at least one sentence for the presence of at least one statistically significant phrase to generate a score indicating the likelihood that the message should have an attachment cause the computer to:
retrieve at least one phrase from a database of phrases; and
inspect the at least one sentence for the presence of the at least one phrase.

20. The computer storage medium of claim 15 wherein the memory device further comprises a database of phrases, and wherein the processor executes the instructions to:
consult a database of predetermined keywords and predetermined phrases; and
after the processor executes the instructions to inspect the at least one sentence for the presence of at least one predetermined keyword or at least one predetermined phrase, the processor further executes the instructions to update the database based upon the indication from the user whether the suggestion is accepted or is rejected.

* * * * *